R. L. WILLIAMSON.
TRACTOR.
APPLICATION FILED DEC. 13, 1917.
1,307,330.
Patented June 17, 1919.
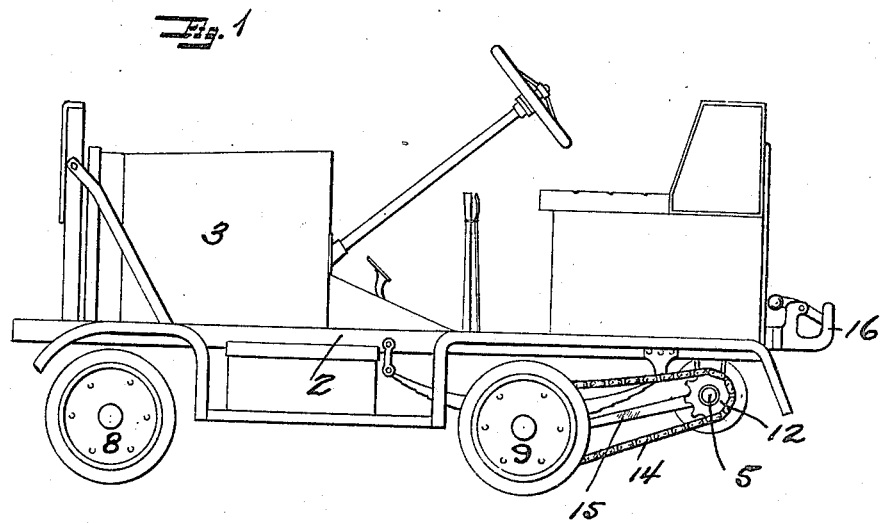
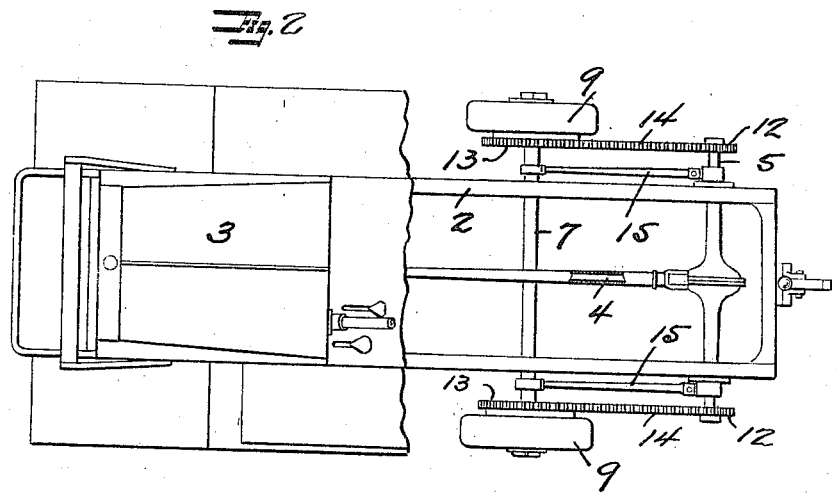
Witness:
J. B. Gardner
INVENTOR
R. L. WILLIAMSON
By White & Pint
ATTORNEYS

UNITED STATES PATENT OFFICE.

RICHARD L. WILLIAMSON, OF TIBURON, CALIFORNIA.

TRACTOR.

1,307,330.   Specification of Letters Patent.   Patented June 17, 1919.

Application filed December 13, 1917.   Serial No. 206,860.

*To all whom it may concern:*

Be it known that I, RICHARD L. WILLIAMSON, a citizen of the United States, and a resident of Tiburon, Marin county, State of California, have invented a certain new and useful Tractor, of which the following is a specification.

The invention relates to tractors.

An object of the invention is to provide a tractor in which the weight of the tractor is concentrated on the driving wheels when the tractor is in operation.

Another object of the invention is to provide a tractor having a short turning radius.

The invention possesses other advantageous features, some of which, with the foregoing, will be set forth at length in the following description, where I shall outline in full that form of the invention which I have selected for illustration in the drawings accompanying and forming part of the present specification. In said drawings I have shown one specific form of my invention, but it is to be understood that I do not limit myself to such form since the invention as expressed in the claim may be embodied in a plurality of forms.

Referring to said drawings:

Figure 1 is a side elevation of the tractor of my invention.

Fig. 2 is a plan view of rear portion of the chassis, showing the transmission construction.

The tractor of my invention comprises a suitable frame or chassis 2, upon the forward end of which is mounted a suitable motor, preferably inclosed by the hood 3. The crank shaft of the motor is connected through suitable power transmission mechanism with the propeller shaft 4, which is connected by suitable gears with the transverse jack-shaft 5 arranged adjacent the rear end of the frame. The jack-shaft is provided with the customary differential gears.

The frame is spring mounted on front and rear axles which are provided at their ends with wheels 8—9, the front wheels 8 being mounted on suitable pivoted spindles, so that they may be turned to steer the tractor. The rear axle 7 is preferably stationary and the wheels 9 are rotatably mounted on the opposite ends thereof, and is disposed between the jack-shaft and the front axle. The axis of the jack-shaft is preferably disposed in a plane above the plane of the axis of the rear axle. Secured to the ends of the jack-shaft are sprockets 12 which are connected to sprockets 13 secured to the rear or traction wheels 9 by the drive chains 14, the sprockets 13 being usually larger in diameter than the sprockets 12. Radius rods 15 are preferably used to transmit the tractive effort of the rear wheels to the tractor frame, so that the springs will be relieved of the tractive effort. Secured to the frame at the rear, and preferably in the plane of the frame, is a coupling 16 to which the load to be drawn is connected.

In this construction, power is transmitted from the jack-shaft to the driving wheels through the lower strands of the chains and since the lower strand of the chain is inclined upwardly and backwardly, the driving strain pulls downwardly on the jack-shaft, tending to raise the front end of the tractor and placing the greater part of the weight of the tractor on the rear wheels, thereby decreasing the tendency of the rear wheels to slip and increasing the tractive power of the machine. The lever arm through which the force is applied which tends to rotate the tractor about the rear axle is dependent upon the horizontal distance from the jack-shaft to the rear axle and the vertical distance of the jack-shaft above such axle and the relative size of the sprockets. The engine 3 is placed over or adjacent to the front axle so that the weight of the vehicle is concentrated at the front end thereby resisting the overturning effects produced by the arrangement of jack shaft and drive wheels. By concentrating the weight at the front end the tractor is enabled to pull a much heavier load without causing the front wheels to be lifted from the ground.

The concentration of weight on the rear wheels lessens the weight on the front wheels, so that the vehicle can be readily steered, and by placing the rear wheels in front of the jack-shaft, the wheel base of the tractor is shortened so that it is capable of short turning radius.

I claim:

A four-wheel tractor comprising a rigid frame, an axle arranged at the front end of said frame, a motor mounted on the front end of the frame so that the weight thereof is principally supported by the front axle thereby concentrating the weight of the tractor at the front axle, a jack shaft supported directly from and arranged beneath the rear end of the frame, a propeller shaft connecting the motor and jack shaft, a rear axle attached to said frame and arranged below and in front of the jack shaft, wheels on said rear axle, sprockets on said wheels and on said jack shaft and chains connecting said sprockets, said parts constituting the entire driving means, whereby the weight of the engine is transferred from the front wheels to the driving wheels and the traction of the latter materially increased, while the steering of the vehicle is rendered easier by the lessening of the weight on the front wheels.

In testimony whereof, I have hereunto set my hand at San Francisco, California, this 3rd day of December, 1917.

RICHARD L. WILLIAMSON.

In presence of—
H. G. PROST.

Copies of this patent may be obtained for five cents each, by addressing the "Commissioner of Patents, Washington, D. C."